US008472621B2

(12) United States Patent
Daemen et al.

(10) Patent No.: US 8,472,621 B2
(45) Date of Patent: Jun. 25, 2013

(54) PROTECTION OF A PRIME NUMBER GENERATION FOR AN RSA ALGORITHM

(75) Inventors: Joan Daemen, Overpelt (BE); Frank Cuypers, De Pinte (BE); Gilles Van Assche, Brussels (BE); Pierre-Yvan Liardet, Peynier (FR)

(73) Assignees: STMicroelectronics (Rousset) SAS, Rousset (FR); Proton World International N.V., Zaventem (BE)

( * ) Notice: Subject to any disclaimer, the term of this patent is extended or adjusted under 35 U.S.C. 154(b) by 530 days.

(21) Appl. No.: 12/787,660

(22) Filed: May 26, 2010

(65) Prior Publication Data
US 2010/0306295 A1 Dec. 2, 2010

(30) Foreign Application Priority Data

May 28, 2009 (FR) .................................... 09 53523

(51) Int. Cl.
*H04L 9/30* (2006.01)
*H04K 1/00* (2006.01)

(52) U.S. Cl.
USPC ............................................ 380/30; 708/200

(58) Field of Classification Search
None
See application file for complete search history.

(56) References Cited

U.S. PATENT DOCUMENTS

| 4,351,982 | A  | * | 9/1982  | Miller et al. .................. 380/30 |
| 5,201,000 | A  | * | 4/1993  | Matyas et al. ................. 380/30 |
| 6,760,752 | B1 | * | 7/2004  | Liu et al. ....................... 709/206 |
| 7,043,018 | B1 |   | 5/2006  | Kasahara et al. |
| 7,233,663 | B2 | * | 6/2007  | Sotoodeh ........................ 380/28 |
| 7,346,637 | B2 | * | 3/2008  | Agrawal et al. ............... 708/200 |
| 7,457,408 | B2 | * | 11/2008 | Knudsen ......................... 380/28 |
| 7,493,661 | B2 | * | 2/2009  | Liu et al. ......................... 726/28 |
| 7,634,084 | B2 | * | 12/2009 | Futa et al. ....................... 380/28 |
| 7,706,528 | B2 | * | 4/2010  | Futa et al. ....................... 380/28 |
| 8,219,601 | B1 | * | 7/2012  | Lepe .............................. 708/200 |
| 2002/0186837 | A1 |   | 12/2002 | Hopkins et al. |
| 2003/0108193 | A1 |   | 6/2003  | Sotoodeh |
| 2004/0049526 | A1 | * | 3/2004  | Joye et al. ..................... 708/250 |
| 2004/0057580 | A1 | * | 3/2004  | Tie et al. ........................ 380/46 |
| 2006/0085643 | A1 | * | 4/2006  | Philips ........................... 713/171 |
| 2008/0310634 | A1 | * | 12/2008 | Pavlovic ....................... 380/270 |
| 2009/0245507 | A1 | * | 10/2009 | Vuillaume et al. ............. 380/28 |
| 2010/0027788 | A1 | * | 2/2010  | Tkacik et al. .................. 380/46 |
| 2010/0128869 | A1 | * | 5/2010  | Dottax et al. .................. 380/44 |
| 2010/0329455 | A1 | * | 12/2010 | Nemiroff ....................... 380/46 |
| 2011/0131424 | A1 | * | 6/2011  | Vigilant ......................... 713/189 |
| 2011/0142231 | A1 | * | 6/2011  | Takeda .......................... 380/30 |

OTHER PUBLICATIONS

Rivest et al, "A Method for Obtaining Digital Signatures and Public Key Cryptosystems", Feb. 1978, Communications of the ACM, vol. 21, No. 2, p. 120-126.*
French Search report dated Feb. 23, 2010 from corresponding French Application No. 09/53523.
Menezes, Vanstone, Oorschot; *Handbook of Applied Cryptography*, 1997, CRC Press LLC, USA XP000863996, pp. 138-140 and 285-291.

* cited by examiner

*Primary Examiner* — Christopher Revak
(74) *Attorney, Agent, or Firm* — Wolf, Greenfield & Sacks, P.C.

(57) ABSTRACT

A method for protecting a generation, by an electronic circuit, of at least one prime number by testing the prime character of successive candidate numbers, including: for each candidate number: the calculation of a reference number involving at least one first random number, and at least one primality test based on modular exponentiation calculations; and for a candidate number having successfully passed the primality test: a test of consistency between the candidate number and its reference number.

43 Claims, 4 Drawing Sheets

PROTECTION OF A PRIME NUMBER GENERATION FOR AN RSA ALGORITHM

CROSS REFERENCE TO RELATED APPLICATIONS

This application claims the priority benefit of French patent application number 09/53523, filed on May 28, 2009, entitled "PROTECTION OF A PRIME NUMBER GENERATION FOR AN RSA ALGORITHM," which is hereby incorporated by reference to the maximum extent allowable by law.

BACKGROUND OF THE INVENTION

1. Field of the Invention

The present invention generally relates to electronic circuits and, more specifically, to circuits executing RSA-type asymmetrical ciphering algorithms. The present invention more specifically relates to the protection, during the generation of prime numbers in an electronic circuit, against side channel attacks, for example, by statistical analysis of the power consumption of the circuit (SPA—simple power analysis) or of its electromagnetic signature, or against fault-injection attacks.

The present invention applies to any electronic circuit exploiting an algorithm exploiting a prime number factorization and, more specifically, to chip cards.

2. Discussion of the Related Art

The RSA algorithm is one of the most commonly used asymmetrical ciphering algorithms (with a public key). This algorithm is used to cipher/decipher data or to sign data and enable them to be authenticated. It is based on the use of a pair of keys comprising a public key and a private key. In ciphering/deciphering mode, the public key is used by a transmitter to cipher data to be confidentially communicated to a receiver, the latter using its private (or secret) key to decipher the data. For an authentication, the private key is used by the transmitter to sign the data while the public key is used by the receiver to authenticate the signature.

The public key is relatively widely accessible to enable the transmitter of the ciphered data or the receiver of the signed data to exploit these data. However, the private key is reserved to the circuit having created the pair of keys. The holder of the pair of keys may directly communicate the public key to the other party to enable it to process the data.

The generation of the pair of public and private keys requires the use of two different relatively prime numbers "p" and "q", of relatively large size (typically, 1,024 or 2,048 bits). The product of these prime numbers represents encryption modulus "n". Numbers p and q are selected so that numbers p−1 and q−1 are prime with a quantity "e", called public exponent, the latter being then prime with the Euler indicator "$\phi(n)$" of product n ($\phi(n)=(p-1)(q-1)$). As a result, there exists an integer "d" such that product e*d is congruent to 1 modulo $\phi(n)$. Pair n and e represents the public key while pair n and d represents the private key. Private exponent d represents the inverse of exponent e, modulo (p−1)(q−1). Prime numbers p and q are only present in the circuit contained the private key.

The robustness of the RSA algorithm depends on prime numbers p and q. To "break" the RSA algorithms based on the public key, one needs to be able to factorize number n, and thus to obtain prime numbers p and q. Once this factorization is known, private exponent d can be calculated from public exponent e (d is obtained by calculating the inverse of e modulo (p−1)(q−1)). It is currently considered that by using modules n of sufficient size (typically on the order of 1,500 bits), current algorithms do not enable, within a reasonable time, to factorize number n.

However, the introduction of numbers p and q into the electronic circuit or their generation by this circuit is particularly critical in terms of security, since their discovery by a hacker at this time of the circuit life provides him with the factorization of number n.

A first technique for generating RSA keys comprises generating these keys outside of the electronic circuit. Quantities p and q are introduced into the electronic circuit in a customization phase. This technique is not responsive to fault injection attacks since the keys are not generated by the actual electronic circuit.

A second known technique comprises having the actual electronic circuit generate the prime numbers in a secure environment (in practice in a protected installation, with a reserved access). With this technique, attacks are not a problem either during the prime number generation.

However, more and more often, electronic circuits are desired to be able to generate their RSA keys outside of such secure environments. This, for example, enables regenerating new keys in the case where a previous key has been repudiated (key assumed to have been hacked). Such a generation is for example performed during a customization of the electronic circuit in a non-secure environment or during a first use (for example, for circuits used for signature calculations or electronic identifiers). According to an example of application to electronic passports, the key is desired to be generated by the electronic chip contained in the passport once it is in its holder's hands. Thus, this key cannot have been previously used in a passport authentication procedure.

Public exponent e may be a parameter of the public key infrastructure (PKI) and is the same for all keys. It is, for example, introduced into the electronic circuit during the manufacturing thereof (in a ROM) or during a customization phase (in an EEPROM).

Public exponent e may also be generated by the electronic circuit, for example, by selection of a random number, and may then be communicated to the elements with which it needs to communicate.

The public key (public exponent and encryption modulus) is thus either known by the receiver (signature) or by the transmitter (ciphering), or communicated thereto (for each transaction and once and for all) by the electronic circuit holding the private key. The public key further needs generally to be certified.

The generation of large prime numbers is costly in terms of time and calculation. In particular, so-called primality tests which enable to validate or not the prime character of a number generally implement modular exponentiations requiring a significant number of calculations (for example, the so-called Miller-Rabin primality test). This is why it is desired to only perform such tests for candidate numbers already having successfully passed tests with respect to relatively small prime numbers. Such tests correspond to divisions by relatively small prime numbers or to comparisons with respect to tables of prime numbers. For example, a Miller-Rabin test can be performed with a small base (two, for example) or a largest common divider calculation may be performed (for example, adding bytes modulo 255 to obtain a result smaller than 255 and then calculate the largest common divider of this result with 255—if it is different from 1, a single test can tell that the number is not dividable by the three factors of 255, that is, 3, 5, and 17).

When the prime numbers are generated by the electronic circuit in a non-secure environment, the circuit is capable of undergoing fault injection attacks (power supply disturbance, laser attacks, etc.) exploited by analysis of the inputs-outputs or of the circuit consumption, or to undergo side channel attacks (SPA or DPA, or electromagnetic analysis).

Another risk of the generation of prime numbers by the electronic circuit is an attack aiming a modifying the number finally selected. An attack at the end of a Miller-Rabin test may be used to modify the number taken into account by the algorithm. If one of numbers p or q is not prime, encryption modulus n is easier to factorize, which decreases the security of the RSA algorithm.

SUMMARY OF THE INVENTION

It would be desirable to protect the generation of prime numbers and, thereby, the generation of the keys of an algorithm using a prime number factorization, when said numbers are generated by the electronic circuit exploiting such keys.

It would further be desirable to be able to detect a modification of a prime number provided by the generation process.

It would further be desirable to be able to mask the prime number generation.

To achieve all or part of these objects as well as others, at least one embodiment of the present invention provides a method for protecting generation, by an electronic circuit, of at least one prime number by testing the prime character of successive candidate numbers, comprising:

for each candidate number:
calculating a reference number involving at least one first random number; and
performing at least one primality test based on modular exponentiation calculations; and for a candidate number having successfully passed said primality test:
testing a consistency between the candidate number and its reference number.

According to an embodiment of the present invention, the reference number is obtained by subtracting from or by adding to the candidate number a quantity depending on said first random number.

According to an embodiment of the present invention, each candidate number is submitted, before the primality test based on modular exponentiation calculations, to at least one primality test based on a sieve table comprising as many elements as there are prime numbers between a first threshold and a second threshold, an initial candidate number being obtained by multiplying an arbitrary number by a first product of the prime numbers smaller than the first threshold.

According to an embodiment of the present invention, passing from one candidate number to the next one comprises adding, to the current candidate and reference numbers, said first product.

According to an embodiment of the present invention, passing from one candidate number to the next one comprises adding, to the current candidate and reference numbers, a multiple of said first product, the multiplier being a function of at least a random number and a second product of the prime numbers ranging between the first and second threshold.

According to an embodiment of the present invention, said multiplier further is a function of a public exponent of the RSA algorithm.

According to an embodiment of the present invention, the sieve table is based on the reference numbers.

According to an embodiment of the present invention, the sieve table is, for example new candidate number, updated by adding to each of its elements said first product modulo the concerned element.

According to an embodiment of the present invention, each candidate number is submitted, before the primality test based on modular exponentiation calculations, to a test of compliance with a public exponent of the RSA algorithm.

According to an embodiment of the present invention, the primality test based on modular exponentiation calculations is a Miller-Rabin test.

At least one embodiment of the present invention also provides an electronic circuit comprising means for implementing the described method.

The foregoing objects, features, and advantages of the present invention will be discussed in detail in the following non-limiting description of specific embodiments in connection with the accompanying drawings.

DETAILED DESCRIPTION

Figure 1:
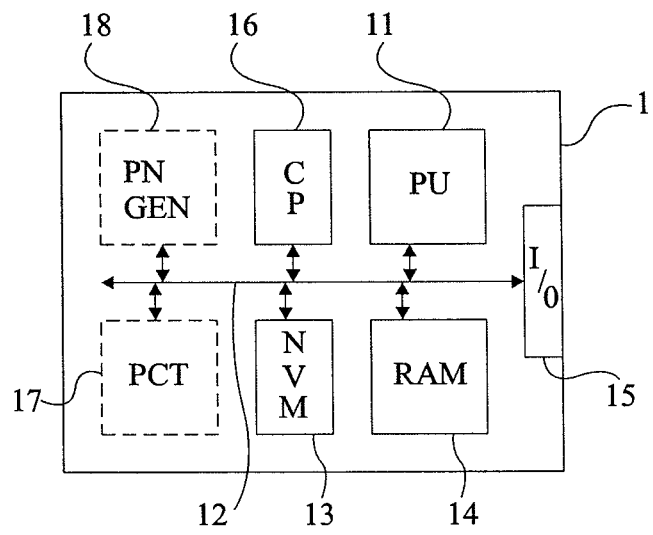
FIG. 1 is a block diagram of an embodiment of an integrated circuit of the type to which the present invention applies as an example.

For clarity, the same elements have been designated with the same reference numerals in the different drawings. Further, only those steps and elements which are useful to the understanding of the present invention have been shown and will be described. In particular, what exploitation is made by the electronic circuit of the algorithm using the keys based on the prime numbers has not been detailed, the present invention being compatible with any usual exploitation (ciphering, signature calculation) of the generated prime numbers.

Embodiments of the present invention will be described hereafter in relation with an example of application to the RSA algorithm used in ciphering/deciphering. It should however be noted that the present invention applies whatever use is made of the RSA algorithm based on the generated prime numbers, the present invention applying in particular to RSA signatures. More generally, the present invention applies to any algorithm having its keys depending on a prime number factorization, for example, the so-called Rabin ciphering system.

FIG. 1 very schematically shows in the form of blocks an example of an electronic circuit 1 (for example, a smart card) of the type to which the present invention applies. Such a circuit comprises a processing unit 11 (PU) capable of communicating, over one or several data, address, and control buses 12, with different elements, among which one or several non-volatile memories 13 (NVM), generally a ROM containing all or part of the programs and an EEPROM intended to contain the RSA keys, one or several volatile memories 14 (typically of RAM type), and interface circuits 15 (I/O) enabling circuit 1 to communicate with the outside. In the applications more specifically aimed by the present invention, circuit 1 also comprises a ciphering or signature calculation processor 16 (CP) that may coincide with central processing unit 11. Circuit 1 is capable of implementing different functions performed by hardware and/or software elements which have been symbolized by a block 17 (FCT) in dotted lines. One of these functions, symbolized by a block 18 (PN GEN), is the generation of prime numbers to be used as keys of an RSA-type algorithm. Other components and circuits may equip electronic circuit 1 according to its destination. Further, direct links (not shown) between sub-assemblies of the circuit in order to exchange data, addresses, and/or control signals may be provided.

Figure 2A:
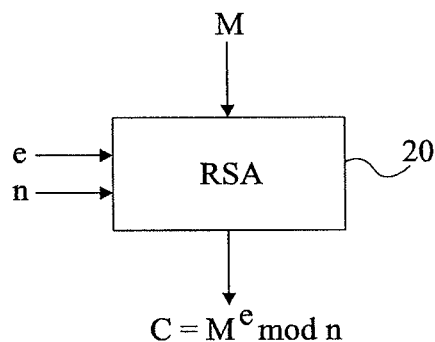
FIG. 2A very schematically illustrates a ciphering by means of an RSA algorithm.
Figure 2B:
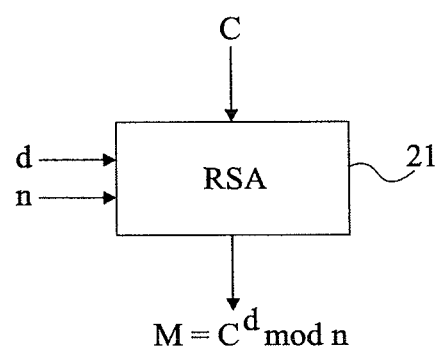
FIG. 2B schematically illustrates a deciphering by means of an RSA algorithm.

FIGS. 2A and 2B illustrate the implementation of an RSA-type algorithm. The RSA calculation cell is symbolized by a block 20 in FIG. 2A (ciphering side) and by a block 21 in FIG. 2B (deciphering side). These calculation cells may in practice be identical, be they software or hardware cells.

The ciphering of a data message M, shown as an integer, is introduced into the RSA calculation block which further contains or receives encryption modulus n and encryption exponent e of the public key. Integer M is smaller than encryption modulus n. The RSA block calculates ciphered message C which represents modular exponentiation $M^e$ mod n.

As to the deciphering by the circuit holding the private key (n, d), message C is submitted to a modular exponentiation based on exponent d and on modulo n, that is, cell 21 provides message M representing $C^d$ mod n.

Figure 3:
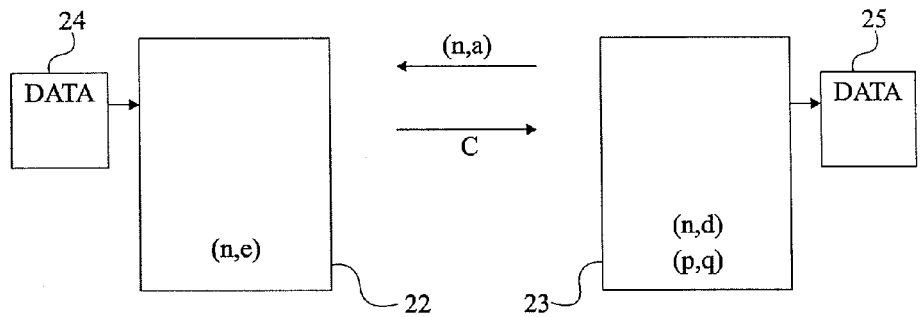
FIG. 3 is a block diagram illustrating a ciphered data transmission system.

FIG. 3 is a block diagram illustrating an example of transmission of data DATA (block 24) representing an arbitrary digital content from a transmitter 22 to a receiver 23. The receiver has the RSA keys and starts, if it is not known by the transmitter, by transmitting the public key thereto, that is, factorization module n and public exponent e. This enables the transmitter to cipher the data and to transmit them in the form of ciphered message C. Receiver 23 uses its private key (n, d) to decipher the messages and obtain data DATA (block 25).

The transmissions are capable of undergoing hacking attempts aimed at discovering the factorization of number n. The present invention does not aim at such attacks once the keys have been generated but at attacks that may happen during the prime number generation, which only occurs once (or at each generation of a new pair of keys).

The generation of a prime number comprises modifying a candidate number until it becomes prime. As indicated previously, simplified tests are performed to verify whether the candidate is prime with relatively small numbers before submitting it to a primality test adapted to large numbers. Tests adapted to large numbers are generally based on the Fermat theorem, according to which if "u" is a prime number, $v^{u-1}$ is congruent to 1 modulo u for any integer "v", that is, there is no possible factorization of number "u" by an integer other than 1 or u. The primality test now most currently used for the prime number generation is the so-called Miller-Rabin test. This test implements modular exponentiation calculations to verify that the candidate is not dividable by another number than 1 and is described, for example, in work "Handbook of Applied Cryptography" by A. Menezes, P. van Oorshchot, and S. Vanstone, published in 1996 (CRC Press), chapter 4, point 4.2.3, pages 138-140. In fact, primality tests are not perfect but the error probability is low enough to be able to consider the candidate as prime.

Figure 4:
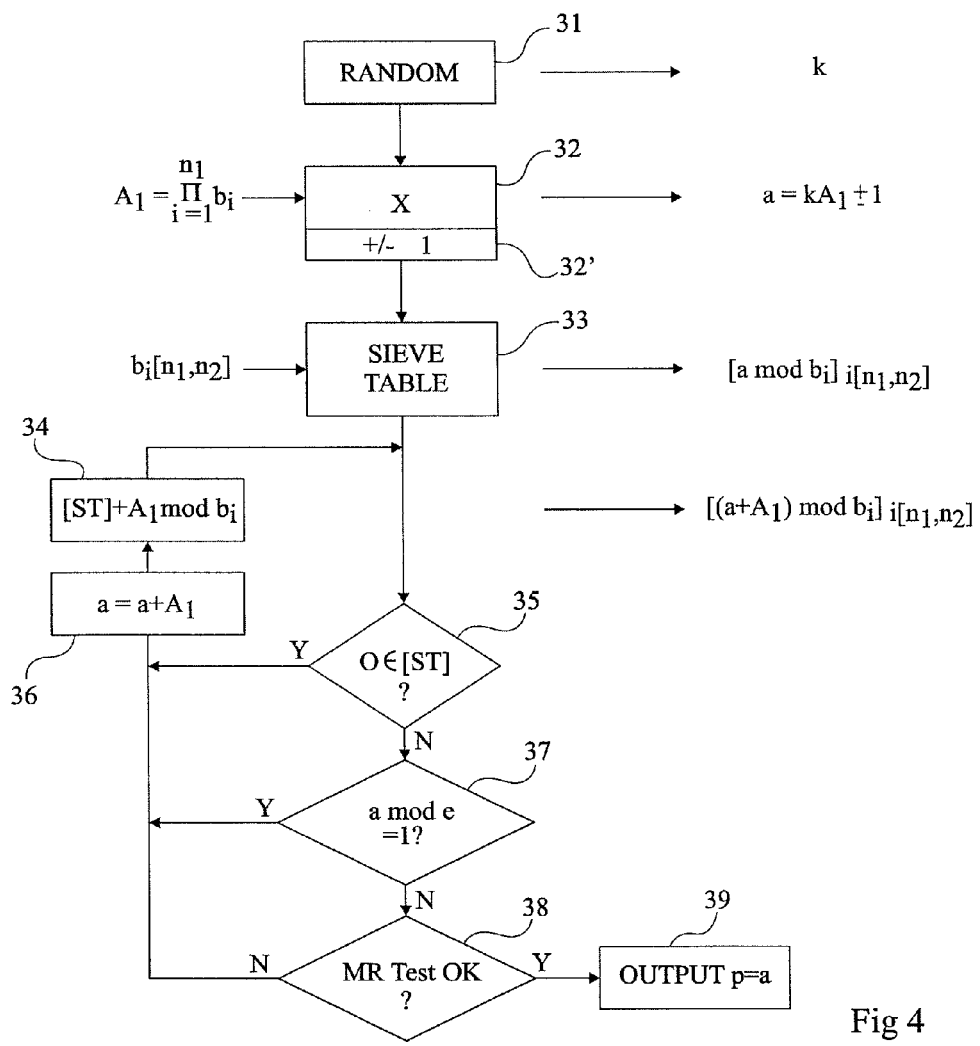
FIG. 4 is a block diagram illustrating usual steps of generation of prime numbers within an electronic circuit implementing an RSA-type algorithm.

FIG. 4 is a block diagram illustrating the steps of a usual method for generating a prime number (arbitrarily designated as p), intended to represent one of the two prime numbers of the RSA factorization modulus. The method of FIG. 4 is generally implemented twice in a row to obtain numbers p and q.

An arbitrary number k is first selected (block 31, RANDOM), for example, by random selection. Then, this number is modified to obtain a candidate non-dividable by prime numbers smaller than a first threshold $n_1$.

According to an example, number k is multiplied (block 32, X) by product $A_1$ of prime numbers $b_i$ smaller than threshold $n_1$ (i ranging between 1 and $m_1$ and $m_1$ representing the number of prime numbers of the group $[1, n_1]$. Threshold $n_1$ is selected to be relatively small. For example, $n_1=3$, $A_1=6$ (m1=3 and $b_1=1$, $b_2=2$, $b_3=3$). If $n_1=5$, $A_1=30$ ($m_1=4$ and $b_1=1$, $b_2=2$, $b_3=3$, $b_4=5$). Then, one (1) is added to or subtracted from the calculated product (block 32', ±1) so that, in the example where $n_1=3$, it is neither dividable by 2 nor by 3. A first candidate $a=k \cdot A_1 \pm 1$, prime with numbers 2 and 3, is obtained.

The size desired for numbers p and q is set. Accordingly, the size of candidates should correspond to that desired for numbers p and q. The size of number k thus depends on that of number $A_1$. In the above example, for a number a of 1024 bits and a number $A_1$ of 30, number k is selected over 1019 bits.

According to another example, number k is modified by performing operation $k=k-(k \bmod A_1)$ to make it dividable by $A_1$. Then, a number, arbitrarily selected from a table of numbers prime with $A_1$, is added. A candidate a, prime with prime numbers smaller than $n_1$, is then obtained. In this example, number k has the same size as that desired for number a.

The next step (block 33) comprises constructing a sieve table ST (SIEVE TABLE), having each of its terms representing the result of the division of candidate a by one of the prime numbers comprised between first threshold $n_1$ and a second higher threshold $n_2$. This amounts to filling the table with values a mod $b_i$, for $b_i$ ranging between $n_1$ and $n_2$ (hence for i ranging between $m_1$ and $m_2$). Such a filling uses divisions implying the candidate, which are sensitive to side channel attacks. Threshold $n_2$ is selected to avoid for the table to be too large and so that the calculations which will be subsequently performed, for each candidate, remain less consuming (in terms of time and power required for the calculations) than a Miller-Rabin test on the candidate. For example, threshold $n_2$ is equal to 128 or 256. For simplification purposes, threshold $n_1$ is considered as part of both groups $[1, n_1]$ and $[n_1, n_2]$, but in practice, threshold $n_1$ is only part of one of these groups in order to save a test iteration, as threshold $n_1$ is usually a prime.

Once the sieve table has been initialized, the next operations are performed as long as candidate a does not correspond to a prime number acceptable for the implementation of the RSA algorithm.

It is started by verifying that the candidate is prime with all the numbers contained in interval $[n_1, n_2]$. This amounts to verifying (block 35, 0∈[ST]?) that this table contains no zero value. The presence of a zero value means that candidate a is a multiple of the corresponding prime number in the table.

If test 35 confirms (output N of block 35) that the candidate is prime with all the numbers in interval $[n_1, n_2]$, it is verified (block 37) that the candidate is appropriate for an implementation of the RSA algorithm. For this purpose, it should be verified that number a−1 is prime with e. In practice, it is checked whether value a mod e (the remainder of the division of a by e) is equal to 1. If not, candidate a is compatible with the RSA, that is, it will respect the condition for exponent e to be an integer prime with Euler indicator (p−1)(q−1).

Once test 37 has been passed (output N), the candidate is finally submitted to several executions (generally from a few executions to a few tens of executions) of a Miller-Rabin primality test (block 38, MR tests OK?). If it passes the test successfully (output Y of block 38), candidate a is provided (block 39, OUTPUT p=a) as prime number p.

As soon as one of tests 35, 37, or 38 indicates that the candidate is not appropriate (outputs Y of blocks 35 and 37 or N of block 38), a new candidate is selected. For this purpose, it is started (block 36, $a=a+A_1$) by adding value $A_1$ to the rejected candidate. Then, sieve table [ST] is updated. This amounts to adding (block 34, [ST]+$A_1$ mod $b_i$) quantity $A_1$ modulo $b_i$ to each of the elements (identified by i) of the table and the method returns to step 35. Although this has not been shown, a variable containing value a mod e which will then be used for test 37 is also updated.

Once a first prime number p has been obtained, the method is implemented again to select the second prime number q necessary to implement the RSA algorithm. An additional step then comprises making sure that numbers p and q are relatively prime (step not illustrated in FIG. 4). Since these are prime numbers, it is sufficient to check that they are different.

The succession of the prime number generation steps is particularly sensitive to side channel or fault injection attacks. Such attacks may have the purpose of discovering the generated prime number or of forcing the generation of a non-prime number. In both cases, this may enable a hacker to discover the private key.

Figure 5:
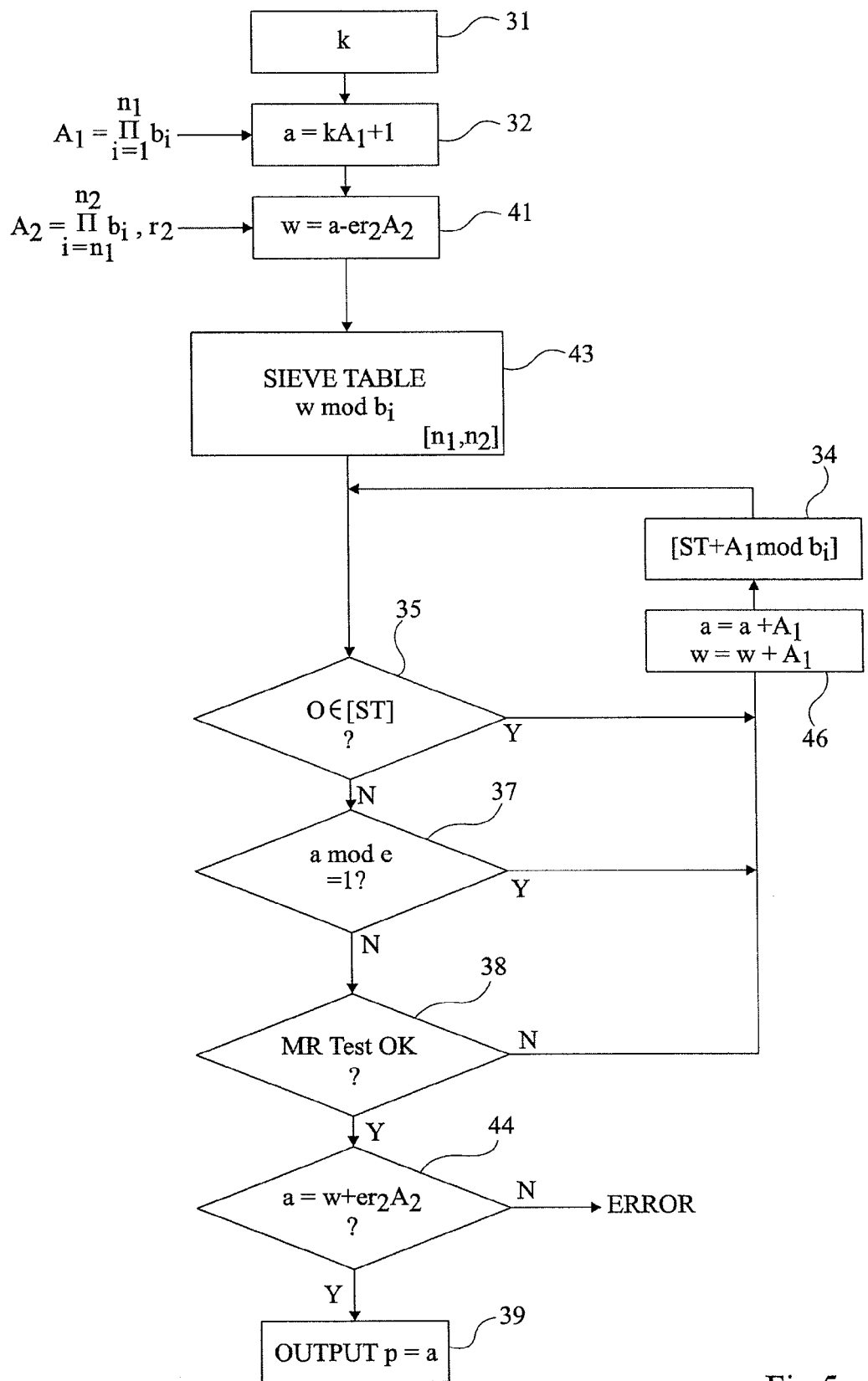
FIG. 5 is a block diagram showing steps of an embodiment of the prime number generation method.

FIG. 5 is a block diagram illustrating an embodiment of the prime number generation method, protected against possible side channel attacks (power analysis or electromagnetic response analysis) or fault injection attacks. This block diagram should be compared with that of FIG. 4.

As previously, it is started by selecting a threshold $n_1$ conditioning a product $A_1$ used in primality tests. For example, threshold $n_1$ is 3 ($m_1$=3) or 5 ($m_1$=4) and product $A_1$ is 6 or 30. Other values of $n_1$ may be selected.

Then (block 31, a), an arbitrary number k is selected and modified to be made non-dividable by the prime numbers smaller than number $n_1$. As previously, the size of number k thus depends on that of number $A_1$. For example (block 32, $a=k \cdot A_1+1$), number k is multiplied by product $A_1$ and added to 1 (as a variation, 1 is subtracted to this result). Other ways of generating first candidate a may be used.

The next step (block 41, $w=a-e \cdot r_2 \cdot A_2$) comprises generating a reference number w which will be used at the end of the generation process to make sure that candidate a has not been disturbed and to protect the divisions by small prime numbers against side channel attacks.

Quantity w is obtained, for example, by subtracting, from candidate a, value $e \cdot r_2 \cdot A_2$, where e represents the public exponent (for example, over 32 or 64 bits), where $r_2$ represents a random number, and where $A_2$ represents the product of the prime numbers in an interval $[n_1, n_2]$. Threshold $n_2$ represents, as previously, a threshold subsequently used for the creation of a sieve table. For example, threshold $n_2$ is selected to be equal to 128 or 256. Other values of $n_2$ may be selected.

The size of random number r2 is equal to the size of candidate a, decreased by the size of public exponent e and by the size of product $A_2$. Thus, the subtracted term has the same size as number a.

This embodiment thus applies to the case where public exponent e is of relatively small size (smaller than some hundred bits). The present invention however also applies to larger numbers e (for example of same size as the prime numbers to be generated). In this case (not shown), number e is not taken into account in primality tests which precede the Miller-Rabin test and its primality with the selected candidate is verified at the end of this test by a specific test (by division).

After, it will be assumed that number e is sufficiently small to be taken into account in the generation of numbers p and q, which avoids a complete primality test on number e.

The next step (block 43) of the generation of number w comprises generating sieve table [ST] based on reference w. It will be seen in relation with FIG. 6 that the sieve table may also be generated based on candidate a.

In the embodiment of FIG. 5, table [ST] comprises as many elements as there are prime numbers $b_i$ in interval $[n_1, n_2]$. Each element corresponds to the division of reference w by the corresponding prime number $b_i$ and is equal to a mod $b_i$. The fact for quantity w to be created by subtracting a multiple of quantities e and $A_2$ from number a enables the values of the sieve table to represent both result w mod $b_i$ and a mod $b_i$.

Then, the following steps are carried out iteratively as long as an acceptable candidate has not been found.

It is started (block 35) by making sure that numbers a and w are prime with all the prime numbers $b_i$ of interval $[n_1, n_2]$. For this purpose, it is verified that one of the elements of table [ST] is zero. If not, it is proceeded to the next test (block 37, a mod e=1?) to verify the compatibility of the candidate with public exponent e.

If a candidate has passed all the previous tests (output N of block 37), it is submitted to the Miller-Rabin test (block 38).

As soon as one of tests 35, 37, or 38 indicates that the candidate is not eligible (outputs Y of blocks 35, 37 or N of block 38), a new candidate and a new reference are calculated (block 46, $a=a+A_1$, $w=w+A_1$) by addition to the previous values of value $A_1$. Then (block 34, [ST]+$A_1$ mod $b_i$), sieve table [ST] is updated by addition of value $A_1$ to all its elements modulo $b_i$. In practice, a variable containing value a mod e (and thus used for test 37) is also updated to a mod $e+A_1$.

The new candidate is then submitted to tests 35 and 37, 38 (the order of tests 35 and 37 is of no importance).

If the candidate is eligible (output Y of block 38), an additional step (block 44, $a=w+e \cdot r_2 \cdot A_2$?) enables to verify the integrity of the candidate with respect to the beginning of the calculation, that is, its consistency with reference w. For example, value $e \cdot r_2 \cdot A_2$ is added to reference w and it is verified that the result is equal to candidate a. If so (output Y of block 44), candidate a is provided (block 39, OUTPUT p=a) as a prime number p. Otherwise (output N of block 44), this means that a disturbance has occurred in the prime number generation. The circuit then proceeds to an error processing (ERROR). As a variation, the test of block 44 verifies that quantity $A_2$ divides value a−w. Such a variation enables to avoid storing random quantity $r_2$. According to another variation, step 41 is replaced by an addition and step 44 is replaced by a subtraction.

The error processing is, for example, the cancellation of the generated prime number (the process is restarted from step 31) or a disabling of the circuit. Such actions to be taken in case a hacking attempt has been detected are conventional per se and multiple solutions exist according to applications.

Consistency or integrity test 44 enables to avoid an attack imposing a number different from number a, after the Miller-Rabin test.

Once a first prime number p has been generated, the process is resumed to generate a second prime number q while verifying that numbers p and q are relatively prime. Finally, to implement the RSA algorithm, factorization module n is calculated ($n=p \cdot q$) and is transmitted (with exponent e) to form the public key to any entity likely to need it. Numbers p and q are only stored in electronic circuit 1.

The fact of constructing the sieve table based on reference number w (instead of number a) enables masking this construction.

Figure 6:
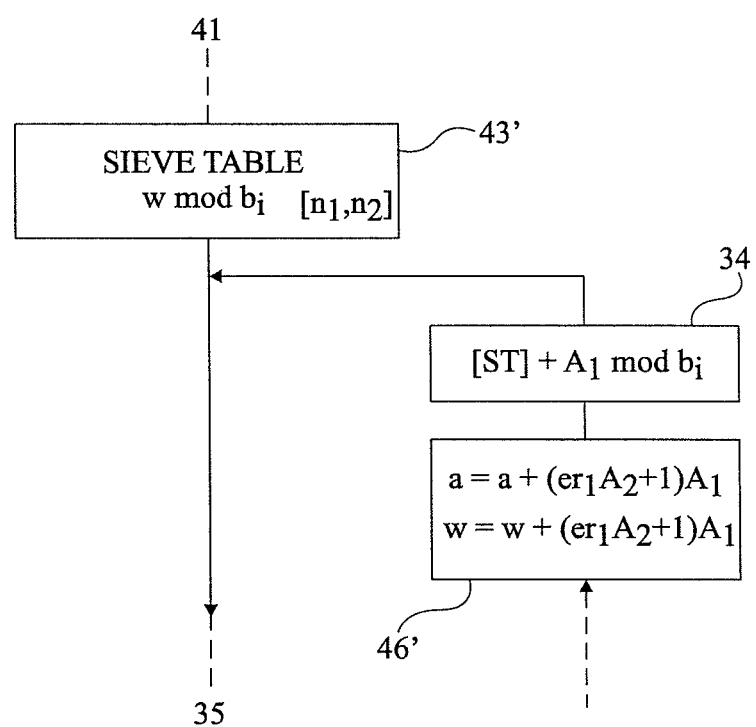
FIG. 6 partially shows in the form of block another embodiment of the prime number generation method.

FIG. 6 is a block diagram illustrating another embodiment. Only the steps modified with respect to FIG. 5 are shown.

As compared with the previous embodiment, the sieve table is based on candidate number a. It is thus initialized (block 43', SIEVE TABLE, a mod $b_{i[n1,n2]}$) with terms a mod $b_i$ of interval $[n_1, n_2]$. To preserve an updating of the sieve table by addition of quantity $A_1$, a quantity f to be added from one candidate to the next candidate and from one reference number to the next reference number (block 46') is constructed so that quantity f is equal to $A_1$ mod $b_i$ and to $A_1$ mod e. For example, a random number $r_1$ is selected independently from number $r_2$ and is multiplied by product $e \cdot A_2$. The size of number $r_1$ is such that the size of product $r_1 \cdot e \cdot A_2$ is smaller (by from a few bytes to a few tens of bytes) than the length required for the prime number to be generated. This enables the passing from one candidate to another to come along with a modification of a large number of the bits. Then, 1 is added to the product. Thus, as illustrated in FIG. 6, a new candidate and a new reference number are obtained by adding (block 46) value $f \cdot A_1$, with $f = e \cdot r_1 \cdot A_2 + 1$, to the previous values. The new candidate and reference number remain prime with the prime numbers smaller than threshold $n_1$. Since $A_2$ is equal to 0 modulo $b_i$, product $(e \cdot r_1 \cdot A_2 + 1)$ is equal to 1 mod $b_i$. The table can then be updated (block 34), as in the previous embodiment, by addition of value $A_1$ to each of the elements of table [ST] modulo prime number $b_i$ of the concerned element.

Various embodiments with different variations have been described hereabove. It should be noted that those skilled in the art may combine various elements of these various embodiments and variations without showing any inventive step. Further, the practical implementation of the present invention based on the functional indications given hereabove is within the abilities of those skilled in the art, be it for a hardware or software implementation.

In particular, the selection of thresholds $n_1$ and $n_2$ used for the tests preceding the Miller-Rabin test depends on the application and on the time that can be dedicated to the Miller-Rabin test during the prime number generation. For example, although it is preferable for the sieve table not to be based on the prime numbers smaller than the first threshold to spare calculations, this is not required.

Further, the selection of the sizes of the random quantities is adapted according to the sizes desired for prime numbers p and q, and thus for the modulo n of the modular exponentiations of the RSA algorithm.

Moreover, although the present invention has been described in relation with a method implementing a single sieve table, it can be envisaged to use several sieve tables by interposing the primality test (steps 34 and 35) of each table before the next table, each table having the function of verifying the primality of the candidate number against prime numbers in contiguous ranges defined by successive thresholds. Such a variation may be used, for optimization purposes, to only update a table if the primality test based on the previous table is validated.

Of course, the present invention is likely to have various alterations, modifications and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting generation, by an electronic circuit, of at least one prime number by testing a prime character of successive candidate numbers, comprising:
   for each candidate number of the successive candidate numbers:
      calculating, with the electronic circuit, a respective reference number involving at least one first random number; and
      performing, with the electronic circuit, at least one primality test based on modular exponentiation calculations; and
   for a candidate number of the successive candidate numbers having successfully passed said primality test, testing a consistency, with the electronic circuit, between the candidate number and its respective reference number.

2. The method of claim 1, wherein the respective reference number is obtained by subtracting from or by adding to its respective candidate number a quantity depending on said at least one first random number.

3. The method of claim 2, wherein each candidate number of the successive candidate numbers is submitted, before the at least one primality test based on modular exponentiation calculations, to at least one primality test based on a sieve table comprising as many elements as there are prime numbers between a first threshold and a second threshold, an initial candidate number of the successive candidate numbers being obtained by multiplying an arbitrary number by a first product of the prime numbers smaller than the first threshold.

4. The method of claim 3, wherein a second candidate number of the successive candidate numbers is determined at least in part based on a prior first candidate number of the successive candidate numbers and the respective reference number of the first candidate number by adding to the first candidate number and the respective reference number of the first candidate number, said first product.

5. The method of claim 3, wherein a second candidate number of the successive candidate numbers is determined at least in part based on a prior first candidate number of the successive candidate numbers and the respective reference number of the first candidate number by adding to the first candidate number and the respective reference number of the first candidate number, a multiple of said first product, the multiple being a function of at least one second random number and a second product of the prime numbers ranging between the first and the second thresholds.

6. The method of claim 5, wherein said multiple further is a function of a public exponent of an RSA algorithm.

7. The method of claim 3, wherein the sieve table of each candidate number is based on the respective reference number of the candidate number.

8. The method of claim 3, wherein for at least one candidate number of the successive candidate numbers, the sieve table is updated from a prior sieve table by adding to each element of the prior sieve table said first product modulo the element.

9. The method of claim 1, wherein each candidate number is submitted, before the at least one primality test based on modular exponentiation calculations, to a test of compliance with a public exponent of an RSA algorithm.

10. The method of claim 1, wherein the at least one primality test based on modular exponentiation calculations comprises a Miller-Rabin test.

11. An electronic circuit comprising means for implementing the method of claim 1.

12. A method, comprising:
testing a primality of a candidate number using a circuit, the testing of the primality of the candidate number comprising:
generating a reference number from the candidate number; and
performing a first primality test on the reference number; and
testing a consistency between the candidate number and the reference number if the candidate number successfully passes the testing of the primality of the candidate number.

13. The method of claim 12, wherein testing the primality of the candidate number further comprises performing a second primality test on the candidate number.

14. The method of claim 13, wherein testing the consistency between the candidate number and the reference number is performed subsequent to performing the first primality test and the second primality test.

15. The method of claim 12, wherein the first primality test comprises a sieve table test involving testing primality of the reference number using each of a plurality of prime numbers between a first threshold and a second threshold.

16. The method of claim 15, wherein testing the primality of the candidate number further comprises performing a second primality test on the candidate number, wherein the second primality test comprises a modular exponentiation calculation.

17. The method of claim 16, wherein the second primality test comprises a Miller Rabin test.

18. The method of claim 12, wherein generating the reference number comprises subtracting from or adding to the candidate number a quantity depending on at least one first random number.

19. The method of claim 12, wherein the circuit forms at least part of a smartcard.

20. An apparatus, comprising:
a circuit configured to test a primality of a candidate number, wherein testing the primality of the candidate number comprises:
generating a reference number from the candidate number; and
performing a first primality test on the reference number,
wherein the circuit is further configured to test a consistency between the candidate number and the reference number if the candidate number successfully passes the testing of the primality of the candidate number.

21. The apparatus of claim 20, wherein testing the primality of the candidate number further comprises performing a second primality test on the candidate number.

22. The apparatus of claim 21, wherein testing the consistency between the candidate number and the reference number is performed subsequent to performing the first primality test and the second primality test.

23. The apparatus of claim 20, wherein the first primality test comprises a sieve table test involving testing primality of the reference number using each of a plurality of prime numbers between a first threshold and a second threshold.

24. The apparatus of claim 23, wherein testing the primality of the candidate number further comprises performing a second primality test on the candidate number, wherein the second primality test comprises a modular exponentiation calculation.

25. The apparatus of claim 24, wherein the second primality test comprises a Miller Rabin test.

26. The apparatus of claim 20, wherein generating the reference number comprises subtracting from or adding to the candidate number a quantity depending on at least one first random number.

27. The apparatus of claim 20, wherein the circuit forms at least part of a smartcard.

28. An apparatus, comprising:
a memory;
means for testing a primality of a candidate number, the testing of the primality of the candidate number comprising:
generating a reference number from the candidate number; and
performing a first primality test on the reference number; and
means for testing a consistency between the candidate number and the reference number if the candidate number successfully passes the testing of the primality of the candidate number.

29. The apparatus of claim 28, wherein testing the primality of the candidate number further comprises performing a second primality test on the candidate number.

30. The apparatus of claim 29, wherein testing the consistency between the candidate number and the reference number is performed subsequent to performing the first primality test and the second primality test.

31. The apparatus of claim 28, wherein the first primality test comprises a sieve table test involving testing primality of the reference number using each of a plurality of prime numbers between a first threshold and a second threshold.

32. The apparatus of claim 31, wherein testing the primality of the candidate number further comprises performing a second primality test on the candidate number, wherein the second primality test comprises a modular exponentiation calculation.

33. The apparatus of claim 32, wherein the second primality test comprises a Miller Rabin test.

34. The apparatus of claim 28, wherein generating the reference number comprises subtracting from or adding to the candidate number a quantity depending on at least one first random number.

35. The apparatus of claim 28, wherein the memory and the means for testing the primality of the candidate number form at least part of a smartcard.

36. At least one processor readable storage device storing processor executable instructions which, when executed by at least one processor, cause the at least one processor to perform a method comprising:
testing a primality of a candidate number, the testing of the primality of the candidate number comprising:
generating a reference number from the candidate number; and
performing a first primality test on the reference number; and
testing a consistency between the candidate number and the reference number if the candidate number successfully passes the testing of the primality of the candidate number.

37. The at least one processor readable storage device of claim 36, wherein testing the primality of the candidate number further comprises performing a second primality test on the candidate number.

38. The at least one processor readable storage device of claim 37, wherein testing the consistency between the candidate number and the reference number is performed subsequent to performing the first primality test and the second primality test.

39. The at least one processor readable storage device of claim 36, wherein the first primality test comprises a sieve table test involving testing primality of the reference number using each of a plurality of prime numbers between a first threshold and a second threshold.

40. The at least one processor readable storage device of claim 39, wherein testing the primality of the candidate number further comprises performing a second primality test on the candidate number, wherein the second primality test comprises a modular exponentiation calculation.

41. The at least one processor readable storage device of claim 40, wherein the second primality test comprises a Miller Rabin test.

42. The at least one processor readable storage device of claim 36, wherein generating the reference number comprises subtracting from or adding to the candidate number a quantity depending on at least one first random number.

43. A smartcard comprising the at least one processor readable storage device of claim 36.

* * * * *